United States Patent
Mallinen

(10) Patent No.: US 9,072,995 B2
(45) Date of Patent: Jul. 7, 2015

(54) BIOFILTER

(71) Applicant: Matti Mallinen, Lahti (FI)

(72) Inventor: Matti Mallinen, Lahti (FI)

(*) Notice: Subject to any disclaimer, the term of this patent is extended or adjusted under 35 U.S.C. 154(b) by 48 days.

(21) Appl. No.: 13/904,220

(22) Filed: May 29, 2013

(65) Prior Publication Data

US 2013/0318935 A1 Dec. 5, 2013

(30) Foreign Application Priority Data

May 29, 2012 (FI) .................................. 20125577

(51) Int. Cl.
| | | |
|---|---|---|
| *B01D 39/02* | (2006.01) | |
| *B01D 46/00* | (2006.01) | |
| *B01D 53/04* | (2006.01) | |
| *B01D 53/44* | (2006.01) | |
| *B01D 53/85* | (2006.01) | |
| *B01D 46/30* | (2006.01) | |

(52) U.S. Cl.
CPC ........ B01D 46/0016 (2013.01); B01D 53/0415 (2013.01); B01D 53/44 (2013.01); B01D 53/85 (2013.01); *B01D 2257/708* (2013.01); *B01D 2257/90* (2013.01); *B01D 2279/30* (2013.01); *B01D 46/30* (2013.01)

(58) Field of Classification Search
CPC .... B01D 24/24; B01D 24/4631; B01D 53/85; C02F 3/04; C02F 3/06; C02F 3/10; C02F 3/101
USPC .......... 55/358, 467, 482, 490, 494, 354, 483, 55/528; 95/275; 435/266, 297.1, 299.1, 435/300.1
See application file for complete search history.

(56) References Cited

U.S. PATENT DOCUMENTS

| | | | |
|---|---|---|---|
| 4,690,697 | A | 9/1987 | Schwartz et al. |
| 5,411,949 | A | 5/1995 | Neef et al. |
| 5,445,660 | A | 8/1995 | Koers |
| 6,117,672 | A * | 9/2000 | Breckenridge ............... 435/266 |
| 6,255,102 | B1 * | 7/2001 | Hallsten ..................... 435/299.1 |
| 2005/0250201 | A1 | 11/2005 | Daly | |

FOREIGN PATENT DOCUMENTS

| | | |
|---|---|---|
| AT | 506938 A4 | 1/2010 |
| CN | 2719384 | 8/2005 |
| DE | 4032234 | 4/1992 |
| DE | 4324714 | 1/1995 |
| DE | 19526788 | 11/1996 |
| DE | 102005011971 A1 | 9/2006 |
| DE | 202006018160 U1 | 5/2007 |

(Continued)

OTHER PUBLICATIONS

Extended European Search Report, dated Jul. 16, 2013, corresponding to EP application.

(Continued)

*Primary Examiner* — Jason M Greene
*Assistant Examiner* — Karla Hawkins
(74) *Attorney, Agent, or Firm* — Young & Thompson

(57) ABSTRACT

A biofilter (1) having filter media (7) in a stowage space (5) having sidewalls and a bottom, inlet opening (15) for the unpurified gases/air and the stowage space (5) is made of flexible gas-tight material filled at least partly with the filter media (7). A biofilter system having two or more biofilters (1) is also described.

20 Claims, 1 Drawing Sheet

(56) References Cited

FOREIGN PATENT DOCUMENTS

JP    3207423    9/1991
KR    100998193  12/2010

OTHER PUBLICATIONS

Finnish Search Report dated Feb. 11, 2013, corresponding to the Foreign Priority Application No. 20125577.

* cited by examiner

BIOFILTER

FIELD OF THE INVENTION

This invention relates to a biofilter

BACKGROUND OF THE INVENTION

Biofilters are used to purificate odorous and VOC (volatile organic compound) gases and air. The technique is to run unpurified gases through the biomaterial which purifies the gases. Biofilters have been designed primarily for odour control at wastewater treatment plants, rendering plants, composting operations, chemical plants, paint industry, biogas fermentation plants, waste handling plants, livestock industry, food industry, beverage industry, etc. A common prior art technique is to build a building which has open airspace at the bottom of the building. On top of the airspace is metal grid or such, which holds the filter media/biomaterial on its place. The unpurified gases are led to the airspace and from there upwards through the filter media/biomaterial. On top of the filter media/biomaterial the purified gases are collected and led to the open air.

There are also transportable versions of the biofilters. These solutions are constructed for example in a freight container. The construction of the freight container is basically the same as described above. These structures are heavy to transport and are not collapsible.

Prior art biofilters are known for example from DE 19526788C and DE 4032234A.

In DE 19526788C is described a system and process for purifying gases. This biofilter is made of steel and has a removable lid. The unpurified gases are passed into a gas inlet space above the filter bed, sprayed with a water, led through the filter bed and directed out from the air space at the bottom of the structure.

In DE 4032234A is described a system where the gases are blowed to the airspace under the filter media. At the same time the gases are humidified. The filter media is stored in a firm/solid structure and the purified gases are released to the open air above the biofilter.

In both of these prior art solutions the filter media is stored in a hard container witch is a fixed/non detachable part of the whole structure. These prior art solutions are also expensive to manufacture and tricky to maintain.

Prior art biofilters are also made by welding hard plastic. This construction is more expensive to manufacture and they are not mechanically so well suitable for stacking the biofilters.

Solutions with solid house-like structures often include perforated pipelines under the filter media. These structures are expensive to build and have a poor maintainability. These structures require also a large area for themselves which is not cost effective. Changing the filter media in all prior art solutions is a complicated and dirty work. If the weather conditions requires covering of the biofilter with a lid or such the maintenance is even more complicated. This means interruptions in the purification processes in the installations they are used in.

SUMMARY OF THE INVENTION

It is an object of the present invention to provide a solution which is a cost effective to build and easy to maintain. In the prior art solutions the corrosive nature of the gases or odorous air are taken care of by surface treatments which are expensive and are corroding/wearing off quickly. This means rapid corrosion to steel and concrete structures. With this invention the corrosive gases are not in contact with the steel structures. The filter media of the biofilter according to this invention is easy to change without interruptions to the purification process. It is easy and cost-effective to do by just changing the sack containing the filter media.

It is another object of this invention to provide a flexible solution which can be increased easily when needed. It has also collapsible structure (bolt connections in the filter body and foldable stowage space) which is easy to transport.

Another object of this invention is to provide a solution with a small used land area. This means smaller investments per used filter media area and better cost efficiency.

The above noted objects of the invention are accomplished by a biofilter which has a light support structure and a soft stowage space for filter media. The structure is collapsible for the transportation. In one embodiment the biofilters can be stored in a pile for optimized use of the open space.

BRIEF DESCRIPTION OF THE DRAWINGS

In the following the invention is described in more detail referring to the drawings where.

DETAILED DESCRIPTION OF THE INVENTION

Figure 1:
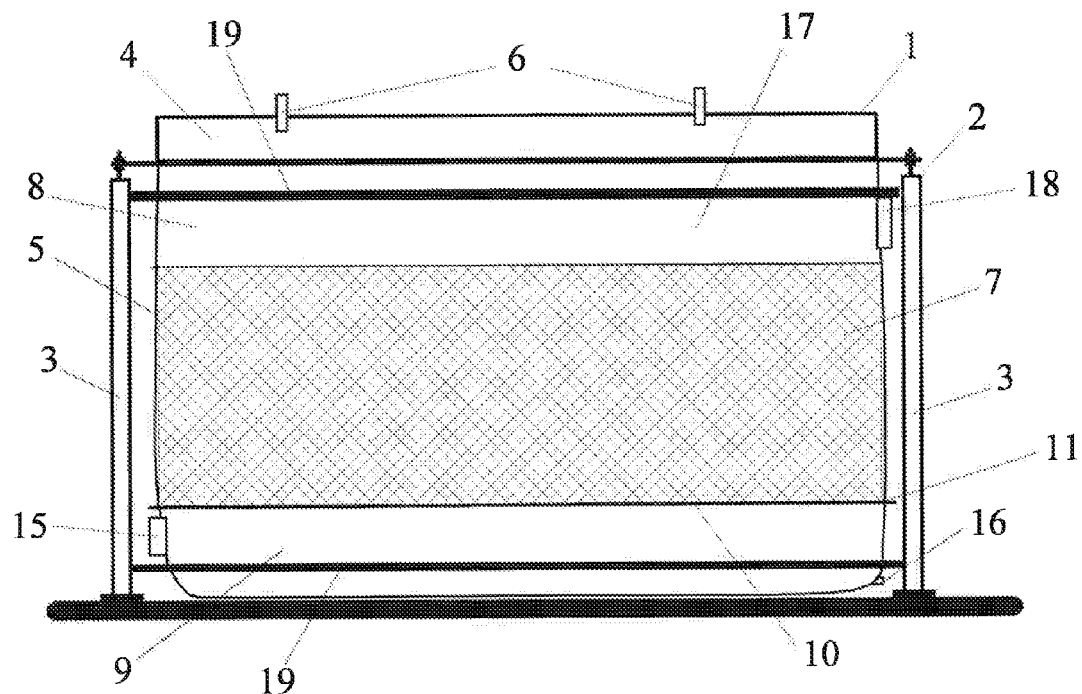
FIG. 1 is a simplified side view of one embodiment of the invention.

In FIG. 1 the biofilter 1 has a solid filter body 2 which includes several vertical supports 3. These vertical supports 3 are connected together with horizontal supports 19 to strengthen the structure. These horizontal and vertical supports are advantageously connected with bolt connections or such for easy dissemble. In another preferred embodiment the solid filter body 2 is designed so that the biofilters can be placed at top of another. These piles can include two or more biofilters. It is obvious that in this case the solid filter body 2 is much stronger than the body in FIG. 1 and has secured connections between piled biofilters.

The vertical supports 3 are connected directly to the rigid upper edge frame 4 of the stowage space 5. The rigid upper edge frame 4 has lifting shackles 6. With these lifting shackles 6 the stowage space 5 can be lifted apart from the solid filter body 2 for changing the filter media 7. The lifting operation can be arranged also using any prior art solution for lifting a sack (stowage space 5) or such. In prior art solutions the stowage space is a fixed part of the filter body structure and could not be separated from it. This means that it is not an easy job to change the filter media. The present invention delivers an easy, clean and fast way to change the filter media 7. This means a better efficiency in the installations they are used in. The lifting shackles 6 can also be directly formed to the stowage space 5 so that the stowage space alone without the rigid upper edge frame 4 can be lifted away.

In another embodiment the stowage space 5 have reinforced openings for connecting the said stowage space 5 to the said solid filter body 2 directly or with hooks, links or such. In this case the solid filter body 2 has advantageously a rigid upper frame for connecting the stowage space 5. The connection between the solid filter body 2 and the stowage space 5 can also be some combination of these. The idea is to have a flexible stowage space 5 which is easily removed and reconnected from and to the solid filter body 2.

The stowage space 5 is made of canvas, tarpaulin, PVC-coated fabric or such flexible material which is airtight. The material is also corrosion resistant or have a corrosion resistant coating. The corrosion resistant material can be selected to correspond the gas to be purified and it is easy and cost effective to change the material if the gas is changed. The cost changes in the biofilters 1 prize due different corrosive gases are small.

In another embodiments the solid filter body 2 is covered with walls, floor and a top plate/lid to insulate/cover the biofilter 1. This is essential at least in cold weather conditions when these outer walls, floor and top plate/lid can be also insulated with an extra insulation material. The top plate/lid also covers the filter media from direct sunlight which helps to maintain steady environment for the microbes if the biofilter is assembled outside. The top plate/lid is advantageously made of the same material as the other parts of the stowage space. However, this is not necessary and other materials can also be used.

The stowage space 5 is divided into a upper and a lower compartment 8 and 9 with gas-penetrable dividing structure 10 which keeps the filter media 7 in upper compartment 8. This dividing structure 10 can be for example a flexible synthetic net, a fabric or a perforated plastic material, a canvas, a tarpaulin, a PVC-coated fabric or such. Also rigid solutions (plastic/metal grid or such) can be used. The upper compartment 8 is filled at least partly with the filter media 7.

Figure 2:
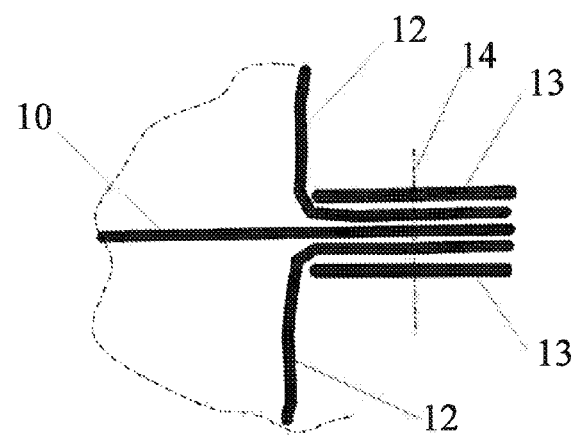
FIG. 2 is a simplified figure of a seam.

The seams 11 in the stowage space 5 can be made using normal seaming techniques like hot melting, glueing or such. Another advantageous method presented in FIG. 2 is to press the flexible fabrics 12 between two metal beams/profiles 13 and connect these beams/profiles 13 with bolts 14 or such. This way the stowage space can be connected to the filter body from the upper part and on the other hand the gas-penetrable dividing structure 10 can be joint to the stowage space to create the lower compartment 9. Advantageously these beams/profiles 13 create a steel rings around the stowage space 5. The stowage space is foldable with these steel rings situated in upper edge and in lower part of the stowage space (where the dividing structure 10 is situated). Such seams 11 do not expose any of the steel structures for the corrosive gases.

In FIG. 1 the lower compartment 9 can be left empty or it can be filled with gas-penetrable media like gravel, plastic grain, foam plastics, expanded clay, foam glass granulate or such. This media spreads the unpurified gases evenly in the lower compartment 9 for efficient use of the biofilter 1. The unpurified gases are led to the lower compartment 9 through an opening 15. To that opening 15 can be connected a hose, a pipe or such for delivering the gases. The delivery line can also be equipped with a blower or such to boost the gas flow.

The stowage space 5 can also have a drain connection 16 in its lower compartment 9. Through this connection the extra humidity which concentrates to the bottom of the stowage space 5 can be eliminated. This is especially important if the filter media 7 or the gases are moisturized.

On top of the upper compartment 8 is a free space 17 for collecting the purified gases. This space 17 can also be filled with gas-penetrable media like gravel, plastic grain, foam plastics, expanded clay, foam glass granulate or such. When the upper compartment is filled the used gas-penetrable media should be light so that the filter media is not compressed and the efficiency of the biofilter is not disturbed.

If the lower compartment 9 is filled with gas penetrable media, which is also incompressible, the biofilter 1 can be assembled to the ground without the solid filter body structure 2. If the gas/air is blowed through the filter media 7 from down to up, free space 17 is automatically generated to the top of the filter media when the biofilter 1 has the top cover/lid (made of flexible material). The top cover/lid can be held up also by rigid structure (stick or such) placed between the filter media 7 and the top cover/lid.

Near the upper edge of the stowage space 5 is also an opening 18 for purified gases. The purified gases can be let out freely through this opening 18 or the opening can be connected to a hose, a pipe or such for more controlled release of the gases. The output line can also be equipped with a suction system to boost the gas flow.

In some conditions the biofilter 1 can be manufactured without a top cover/a lid so that the purified gases are released directly to open air as they come through the filter media 7.

In another preferred embodiment the gas flow can be directed from the top of the biofilter 1 to the bottom of the biofilter. In this case the upper compartment 8 is closed and it has advantageously an open space on top of the filter media 7 which is empty or filled with the gas-penetrable media. The lower compartment 9 can be empty or filled with the gas-penetrable media. The system requires at least a blower at the intake side or a suction system at the output side of the biofilter 1 or both.

A simple structure of the biofilter is having the flexible stowage space 5 filled in two layers with gas-penetrable media and filter media 7 and having free space on top of the filter media (open biofilter or supported lid structure). Even the dividing structure 10 can be eliminated if the medias are selected so that they do not get mixed easily.

The gas-penetrable media can also be used for growing microbes and so use the whole stowage space 5 for purification.

If the filter media 7 is chosen to be incompressible the stowage space 5 can include only one media and one compartment without the dividing structure 10. This gives also the possibility to stack the biofilters 1 without the rigid filter body 2 to be stacked on top of one other. These sacks can be lifted like any other sacs made of flexible material or transported on top of a platform by forklift.

The prior art solutions all include large investments when the biofilter according to this invention is cost effective. The unpurified gases are often corrosive which requires a surface treatment to the concrete and steel structures in the prior art solutions. This is expensive and these surface treatments tend to wear off rapidly. The biofilter according to this invention do not expose the solid filter body or other steel structures to corrosive environment at all.

The prior art solutions have larger transport costs due the bigger and heavier structures of these biofilters. This invention delivers a solution which is light, small and easily assembled, dismountabled and reassembled. When the filter body is easily disassembled and the flexible stowage space is foldable the transportation is easy and cost-effective. As a filter media it can be used local materials.

With this invention the changing of the filter media is fast, clean and the changing disturbs less the purification process than in the prior art solutions. The used and the new filter media are also easy to transport in the flexible stowage space which is easily separated from the solid filter body structure. Also the microbes in the new filter media can be activated in the filter media factory for the seamless operation of the filtering plant. With changing one biofilter at a time in the plants containing several biofilters the plants efficiency can be maintained high without shutdown or disturbances.

The biofilter can also be equipped with a filter media moisturizing unit, a measuring unit for the temperature and for the moisture and an automatic control unit of the temperature and the moisture. For cold conditions the flexible stowage space can be constructed with two parallel outside layers. The air between these two layers can be heated and circulated in extreme conditions to maintain the biofilters function. This heating is preferably done with electric heater. The heating can be arranged also with heat exchanger and with warm water, air, steam or such.

In prior art filters the filter media tends to generate passages through the filter media leading to the gases passing the filter media without purification. This effect can be eliminated in the biofilters according to this invention. This is done by connecting to the biofilter a vibrator which is activated when the predetermined time period is passed. This vibration closes the passages generated to the filter media and the biofilters efficiency is regained. This method cannot be done with most of the prior art biofilters.

While this invention has been described fully and completely it should be understood that within the scope of the appended claims the invention may be practiced otherwise than especially described herein.

The invention claimed is:

1. A biofilter, comprising:
    filter media;
    a stowage space having sidewalls and a bottom, inlet opening for the unpurified gases/air, said stowage space being made of flexible gas-tight material and filled at least partly with the filter media;
    a rigid upper frame connected said stowage space to a solid filter body structure; and
    a gas-penetrable dividing structure joined to the stowage space with two metal beams pressed together, said dividing structure dividing the stowage space into an upper compartment and a lower compartment, and said rigid upper frame comprising lifting shackles for removal of the said stowage space from the said solid filter body structure.

2. The biofilter according to claim 1, characterized in that the said stowage space is made of canvas, tarpaulin, PVC-coated fabric, flexible fabric or flexible material which is airtight.

3. The biofilter according to claim 1, wherein the biofilter has a solid filter body structure on which said stowage space is supported.

4. The biofilter according to claim 1, wherein said stowage space is divided into the upper and lower compartments with a gas-penetrable dividing structure of flexible synthetic net, fabric or perforated plastic material, canvas, tarpaulin, PVC-coated fabric, or rigid grid, and the stowage space has the filter media in the upper compartment.

5. The biofilter according to claim 4, wherein said lower compartment is empty or filled with gas-penetrable media like gravel, plastic grain, foam plastics, expanded clay, or foam glass granulate for spreading the unpurified gases evenly in the lower compartment for use of the biofilter.

6. The biofilter according to claim 1, wherein said stowage space has and a drain connection in the lower compartment for eliminating humidity which concentrates to the bottom of the stowage space.

7. The biofilter according to claim 1, wherein said stowage space has a cover piece/lid on top of the biofilter and said stowage space has free space or space filled with gas-penetrable media selected from gravel, plastic grain, foam plastics, expanded clay, or foam glass granulate on top of said filter media in the upper compartment and controlled output of the purified gases through opening, pipe, or hose.

8. The biofilter according to claim 1, wherein the biofilter has a blower at a gas entry side of the biofilter or a suction system at a gas output side of the biofilter or both.

9. The biofilter according to claim 1, wherein the biofilter is configured to lead gases to be purified through the filter media from a top to a bottom or from the bottom to the top.

10. The biofilter according to claim 1, wherein the biofilter includes a vibrator, which is activated when a predetermined time period is passed, for eliminating passages through the filter media for gases to pass the filter media without purification.

11. The biofilter according to claim 1, wherein an outer surface of said stowage space is made out of two parallel outside layers, and the biofilter is configured to heat and circulate the air between the layers with an electric heater or heat exchanger.

12. A biofilter system comprising two or more biofilters according to claim 1, wherein the biofilters are placed in a stack.

13. The biofilter according to claim 7, wherein the biofilter has a blower at a gas entry side of the biofilter or a suction system at a gas output side of the biofilter or both.

14. The biofilter according to claim 7, wherein the biofilter is configured to lead gases to be purified through the filter media from a top to a bottom or from the bottom to the top.

15. The biofilter according to claim 8, wherein the biofilter is configured to lead gases to be purified through the filter media from a top to a bottom or from the bottom to the top.

16. The biofilter according to claim 1, wherein the filter media is incompressible and said lower compartment is filled with the incompressible filter media for assembling the biofilter to the ground without the solid filter body structure.

17. The biofilter according to claim 1, wherein the filter media includes at least two flexible fabrics are pressed between the two metal beams.

18. The biofilter according to claim 17, wherein the two metal beams are connected with bolts.

19. The biofilter according to claim 17, wherein the two metal beams form rings around the stowage space.

20. The biofilter according to claim 19, wherein the stowage space is foldable with the rings are situated in an upper edge and in a lower part of the stowage space.

* * * * *